(No Model.)

M. COHEN.
ROACH TRAP.

No. 455,096.  Patented June 30, 1891.

WITNESSES:
P. H. Nagle.
L. Douville

INVENTOR
Meyer Cohen
BY
John A. Wiedersheim
ATTORNEY.

United States Patent Office.

MEYER COHEN, OF PHILADELPHIA, PENNSYLVANIA.

ROACH-TRAP.

SPECIFICATION forming part of Letters Patent No. 455,096, dated June 30, 1891.

Application filed January 7, 1891. Serial No. 376,941. (No model.)

*To all whom it may concern:*

Be it known that I, MEYER COHEN, a citizen of the United States, residing in the city and county of Philadelphia, State of Pennsylvania, have invented a new and useful Improvement in Roach-Traps, which improvement is fully set forth in the following specification and accompanying drawings.

My invention consists of a roach or other insect trap formed of a box with one or more gauze sides and a bait-holder of novel construction, said holder being removably connected with the floor of the box and the latter having a door for access to the interior of the same.

It also consists in so constructing the bait-holder that it constitutes a grater for purposes hereinafter described.

Figure 1:
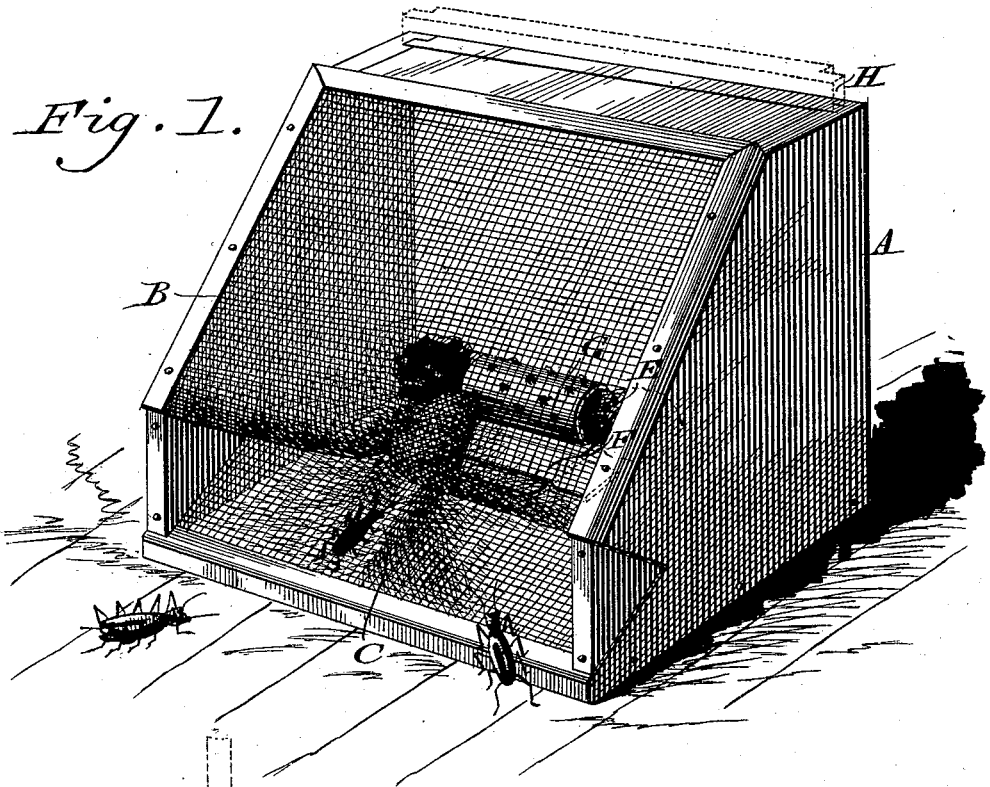
Figure 2:
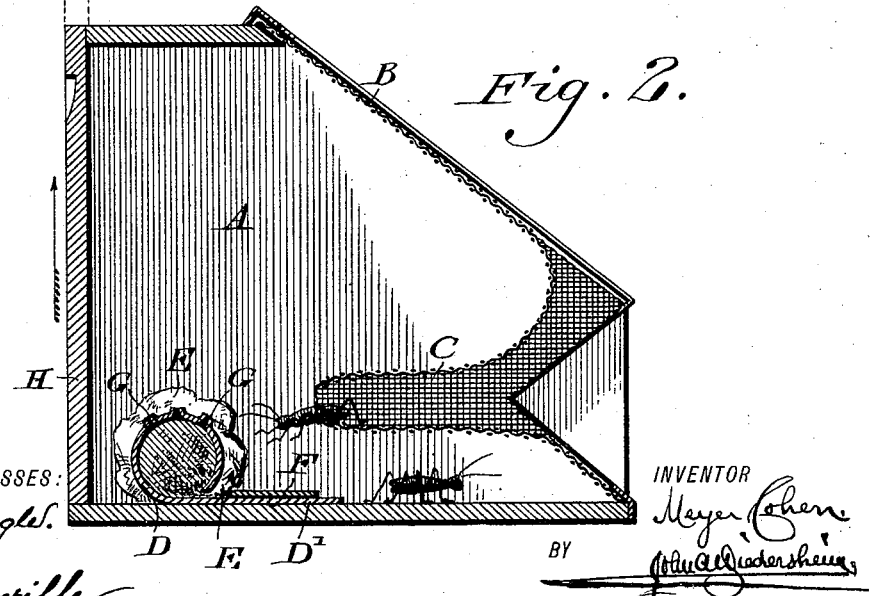

Figure 1 represents a perspective view of a roach-trap embodying my invention. Fig. 2 represents a vertical section thereof.

Similar letters of reference indicate corresponding parts in the two figures.

Referring to the drawings, A designates a box having the front side B formed of gauze for light and air, a portion of which side is pressed inwardly, forming a spout C, by which the insects are permitted to enter the box.

D designates the bait-holder, the same consisting of a plate of metal, &c., which is bent into tubular form and serving to embrace a piece E of sponge or other material, one end D' of the plate constituting a tongue, which is inserted into a keeper F on the floor of the box, whereby the holder is supported.

A portion of the plate is punched or otherwise formed into a grater G, which is preferably on the upper side of the holder, so as to be conveniently reached from the back of the box, where the door H is provided, said door and box being formed with tongues and grooves, whereby the door is held in position, and may be readily removed and reapplied by sliding motions.

The operation is as follows: The sponge, &c., are saturated with vinegar or supplied with sugar or other material which forms an attractive bait to the insects; but as it is desirable to impart a high odor to the trap, so as to direct the insects thereto, some onion is grated on the holder, the desirable bait, however, being set back from the inner end of the entrance-spout, so that it is necessary for the insects to be fully within the box in order to reach said bait, it being evident that after the insects leave the spout they are trapped, as said spout is elevated above the floor and all other portions of the box are closed. The insects may be removed by opening the door H, and access is also had to the holder, which may be displaced, cleansed, and resupplied with baiting material, it being noticed that the plate constituting the holder is of the form of a wrapper, which may be unrolled from the sponge and afterward re-rolled thereupon.

Having thus described my invention, what I claim as new therein, and desire to secure by Letters Patent, is—

1. In a roach-trap, a bait-holder consisting of a tube having a tongue for connection with a keeper secured to the box, and a grater on said bait-holder, said parts being combined substantially as described.

2. An insect-trap provided with a bait-holder having a portion forming a grater, substantially as described.

3. An insect-trap consisting of a box having a front side of gauze, with an inward-projecting spout, a tubular plate forming a bait-holder, having a tongue at one end, a keeper on the floor of the box, into which said tongue is inserted, and a door in the back of the box, a portion of the plate or holder forming a grater, said parts being combined substantially as described.

MEYER COHEN.

Witnesses:
JOHN A. WIEDERSHEIM,
A. P. JENNINGS.